United States Patent Office 3,662,036

Patented May 9, 1972

3,662,036

PROCESS FOR THE PREPARATION OF O-ETHYL-O-p-NITROPHENYL-ETHYLPHOSPHONATE

Masahiko Ikemoto, Honmachi, Kiyoshi Ito and Kazuhiko Kimura, Ohtsu-shi, and Teruo Nakanishi, Kyoto-shi, Kyoto-fu, Japan, assignors to Kakenyaku Kako Kabushiki Kaisha, Tokyo-to, Japan No Drawing. Continuation-in-part of application Ser. No. 760,701, Sept. 18, 1968. This application June 24, 1969, Ser. No. 836,140

Int. Cl. C07f 9/40, 9/42

U.S. Cl. 260—969 3 Claims

ABSTRACT OF THE DISCLOSURE

O-ethyl-O-p-nitrophenyl-ethylphosphonate is prepared by dioxyethylating trichlorophosphine, reacting the diethyl chlorophosphite so produced with an alkali metal salt of p-nitrophenol to produce diethyl-p-nitrophenyl phosphite, and reacting this last-mentioned compound with an ethyl halide under heat and pressure. O-ethyl-O-p-nitrophenyl-ethylphosphonate is effective in solution in sterile distilled water for the treatment of glaucoma and accommodative convergent strabismus by dropping into the eye.

CROSS REFERENCE

The present application is a continuation-in-part of co-pending application Ser. No. 760,701, filed Sept. 18, 1968 and now abandoned.

DETAILED DESCRIPTION OF THE INVENTION

O-ethyl-O-p-nitrophenyl-ethylphosphonate has been announced in recent years as one of the organic compounds of phosphorus, and has been given wide attention.

The following equations illustrate the well-known method for manufacture of O-ethyl-O-p-nitrophenyl-ethylphosphonate by preparing triethyl phosphite from trichloro phosphine as the starting material, then by the Arbusow rearrangement preparing O,O-diethyl-ethylphosphonate, then preparing ethyl ethanechlorophosphite by halogenation of this product, and finally reacting the chloro-derivative product with the sodium salt of p-nitrophenol (see J. Amer. Chem. Soc., 81, 372, 1959):

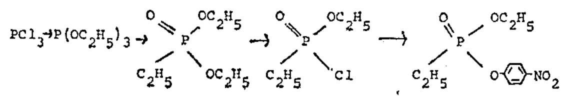

This prior art method is disadvantageous, however, in that its individual procedures are complex and, in addition, the final yield after carrying out all of the steps is as low as about 19–20%.

The applicants have discovered that the

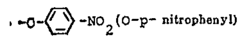

group can be combined with the phosphorus atom prior to conducting a rearrangement similar to the Arbusow rearrangement which involves a trialkyl phosphite.

Unlike the prior method, the method of this invention is conducted in the following manner:

First, trichlorophosphine, as the starting raw material, is reacted with an ether solution of anhydrous ethanol and diethyl aniline at low temperatures to obtain diethyl chlorophosphite, then diethyl-p-nitrophenylphosphite is obtained by adding to the previous product, a methylethylketone solution of a dried alkali metal salt of p-nitrophenol, after that the p-nitrophenyl derivative is reacted by autoclaving with an ethyl halide in a closed tube at 120°–140° C. for from 5–7 hrs. and O-ethyl-O-p-nitrophenyl-ethylphosphonate is separated from the reaction mixture.

This process is illustrated by the following equations:

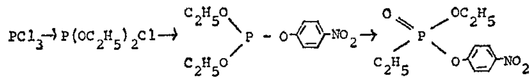

The method of this invention is an excellent one which has one less step than the prior art method and gives a favorable total yield after carrying out all steps, as high as above 40%.

The following examples are given as illustrating, but not as limiting, the method of the invention:

EXAMPLE 1

Diethyl chlorophosphite

To 92 g. of anhydrous ethanol, 298 g. of diethyl aniline, and 500 ml. of anhydrous ether, there is added dropwise with stirring a mixture of 137.5 g. of trichloro phosphine and 100 ml. of anhydrous ether. Stirring is continued for 1–3 hrs. and the resulting precipitate is filtered by suction. Removal of ether and distillation of the filtrate under reduced pressure gives 117.4 g. of diethyl chlorophosphite. B.P. 41–42.8° C./11 mm. Hg, 75% yield.

EXAMPLE 2

Diethyl-p-nitrophenylphosphite

To a mixture of 16.1 g. of well dried sodium salt of p-nitrophenol and 130 ml. of anhydrous methylethylketone, there is added dropwise with stirring a solution of 15.7 g. of diethyl chlorophosphite in 15 ml. of anhydrous methylethylketone at room temperature. Then, the mixture is refluxed gently for about an hour in a water bath. The solids which separate on refluxing are removed by filtration. After removing as much of the methylethylketone as possible under reduced pressure, the remaining diethyl-p-nitrophenylphosphite is used for the reaction described in the next example.

EXAMPLE 3

O-ethyl-O-p-nitrophenyl-ethylphosphonate

The crude diethyl-p-nitrophenylphosphite produced in the above described manner is transferred into a tube together with 20 g. of ethyl iodide and closed. The enclosed material is reacted by heating at a temperature of 120°–140° C. for 5–7 hrs. After that, ethyl iodide is removed by distillation under reduced pressure, then the residue is dissolved in ether, and washed several times with a cold 5% aqueous solution of caustic soda. After washing with water, drying and then removing ether, 15.1 g. of O-ethyl-O-p-nitrophenyl-ethylphosphonate is obtained by distillation under reduced pressure.

B.P. 135–140° C./0.04 mm. Hg, 58% yield. $n_D^{30}$ 1.5195; $d_4^{30}$ 1.2446.

Calculated: C, 46.34; H, 5.44; N, 5.40. Found: C, 46.17; H, 5.61; N, 5.37. (Molecular formula.—

$C_{10}H_{14}NO_5P$)

O-ethyl-O-p-nitrophenyl-ethylphosphonate possesses a remarkable anti-cholinesterase action, and being capable of aiding the mechanisms of the contraction of the pupil and the smooth muscle, this compound can be used for the cure of myasthenia and for acceleration of parturition.

The miotic action referred to here is the contraction of the sphincter of the pupil within the eyeball or the relaxation of the dilator muscle of the pupil. The former is based on parasympathetic innervation and the latter on a sympathetic one. Drugs which cause the pupil to contract, inducing miosis through such action, are termed miotics.

Meanwhile, an abnormal condition called glaucoma is caused by an abnormal accumulation of aqueous humor which increases endophthalmic pressure to the extent that blindness will occur unless the condition is quickly relieved. In order to keep the inner pressure of the eyeball constant, maintain blood and lymph circulation, and preserve the elasticity of the eyeball wall, innervation should be maintained in perfect order. Administration of miotics upon an abnormal uprise of endophthalmic pressure will enlarge the gonic part strongly, increase the increment of excretion of aqueous humor by the exposure of the Schulem duct, a duct effecting excretion of aqueous humor, and thus cause a decrease of the endophthalmic pressure. Accordingly, miotics which posses the miotic action mentioned above, are most suitable for treatment of glaucoma.

In this connection, accommodative convergent strabismus is said to be one of the disorders which is apt to occur in infancy when various functions of the eye have not yet developed completely. For an infant, considerable adjustment is needed when an object at a short distance is observed, since his lens is such as to cause him to be hypermetropic. The excessive adjustment required will bring about accommodative convergent strabismus. When a miotic is administered to such an infant, his lens is adjusted and becomes thick, effecting a gradual approach to an emmetropic condition.

O-ethyl-O - p - nitrophenyl-ethylphosphonate exhibits a miotic action with potent and prolonged anti-cholinesterase activity, which makes it very useful as a medicine for the treatment of glaucoma and accommodative convergent strabismus. Based on the discovery that this substance has these activities, this invention further relates to a method, by which the dilute solution of this drug can be used as an ophthalmic for the treatment of glaucoma and accommodative convergent strabismus.

The drug is formulated by dissolving it in sterile distilled water or a non-aqueous solvent such as propylene glycol or peanut oil at a concentration of about 0.0001% to 0.01% by weight. The solution thus produced will also preferably contain, as is conventional with eye lotions, a germicidal agent, such as sodium ethylmercurithiosalicylate. When the liquid carrier is water, there may also be added sodium chloride and boric acid, as is also conventional with aqueous eye lotions.

The lotion containing the drug is administered by dropping it into the patient's eyes one or twice a day, one or two drops at a time.

The following examples represent preferred fomulations for the treatment of glaucoma and accommodative convergent strabismus:

EXAMPLE 4

0.005 g. of O-ethyl-O-p-nitrophenyl-ethylphosphonate, 0.74 g. of sodium chloride, 0.124 g. of boric acid and 0.003 g. of sodium ethylmercurithiosalicylate are dissolved in sterile distilled water to 100 ml.

EXAMPLE 5

0.0025 g. O-ethyl-O - p - nitrophenyl-ethylphosphonate, 0.74 g. of sodium chloride, 0.124 g. of boric acid and 0.003 g. of sodium ethylmercurithiosalicylate are dissolved in sterile distilled water to 100 ml.

EXAMPLE 6

0.00125 g. of O-ethyl-O-nitrophenyl-ethylphosphonate, 0.74 g. of sodium chloride, 0.124 g. of boric acid and 0.003 g. of sodium ethylmercurithiosalicylate are dissolved in sterile distilled water to 100 ml.

EXAMPLE 7

0.01 g. of O - ethyl-O-p-nitrophenyl-ethylphosphonate and 0.003 g. of sodium ethylmercurithiosalicylate are dissolved in propylene glycol to 100 ml.

EXAMPLE 8

0.0001 g. of O-ethyl-O-p-nitrophenyl-ethylphosphonate and 0.003 g. of sodium ethylmercurithiosalicylate are dissolved in peanut oil to 100 ml.

We claim:

1. A process for the preparation of O-ethyl-O-p-nitrophenyl-ethylphosphonate consisting of dioxyethylating trichlorophosphine to produce diethyl chlorophosphite, reacting said diethyl chlorophosphite with an alkali metal salt of p-nitrophenol to produce diethyl-p-nitrophenyl phosphite and autoclaving said diethyl-p-nitrophenyl phosphite with an ethyl halide at a temperature of from 120°–140° C.

2. A process as claimed in claim 1 in which the autoclaving is carried out for from 5–7 hours.

3. A process as claimed in claim 2 in which the ethyl halide is ethyl iodide.

References Cited

UNITED STATES PATENTS 3,483,279 12/1969 Davis et al. ---------- 260—969

OTHER REFERENCES

Kossolapoff, Organophosphorus Compounds, John Wiley & Sons, Inc., New York, 1950, pages 121 to 123, 181, 186 and 187.

JOSEPH REBOLD, Primary Examiner

R. L. RAYMOND, Assistant Examiner

U.S. Cl. X.R.

260—954, 973, 976, 986; 424—218